United States Patent Office 3,008,493
Patented Nov. 14, 1961

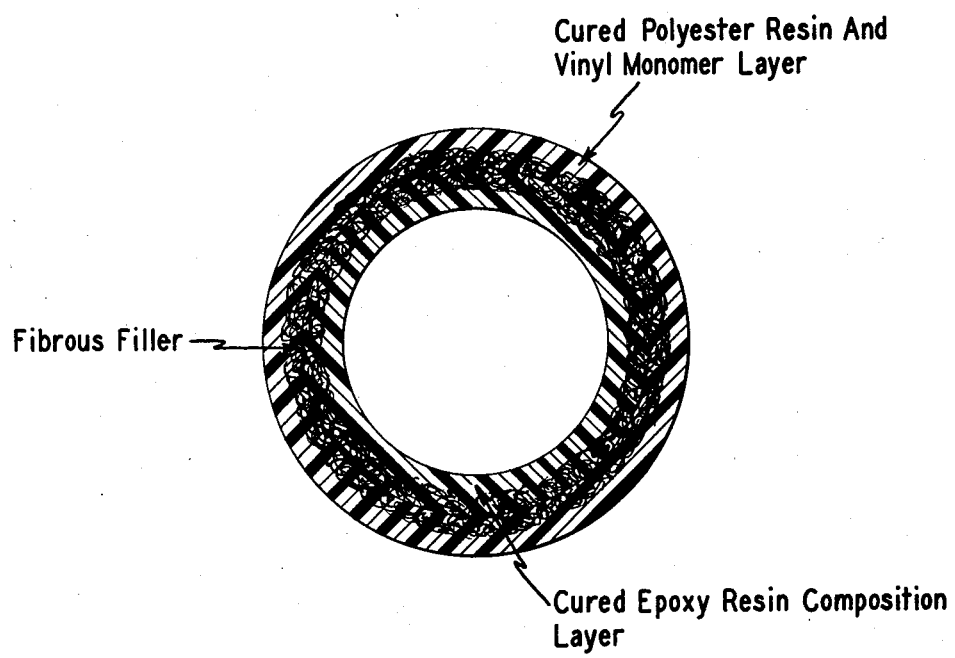

3,008,493
COMPOSITE PLASTIC PIPING
Douglas M. Roe, Basking Ridge, N.J., assignor to Union Carbide Corporation, a corporation of New York
Original application July 6, 1955, Ser. No. 520,367. Divided and this application Feb. 9, 1959, Ser. No. 791,838
5 Claims. (Cl. 138—146)

This invention relates to the fabrication of plastic pipe having substantial heat resistance. This application is a divisional application of Serial No. 520,367, filed July 6, 1955, now abandoned.

Numerous organic plastic materials have been used in the fabrication of pipe by procedures such as casting, lamination, extrusion, centrifugal casting and the like. Such pipe is usually light in weight and corrosion resistant. Plastic pipe of superior structural strength has been obtained heretofore by impregnating fibrous webs, such as cotton duck cloth, or glass fiber cloth, with resin-forming ingredients that under suitable conditions of heat or catalysis polymerize or cure to a solid state. The impregnated fibrous web is then formed into a tubular shape as by wrapping on a mandrel, and then polymerizing or curing the resin-forming ingredients to bind together the several layers into a strong fluid-impervious structure.

Fabric-reinforced pipe has also been prepared by the centrifugal casting method, wherein a cylindrically wrapped fibrous web or mat is placed in a heated cylinder mold, which is then rotated while plastic composition or resin-forming materials are introduced. The centrifugal force pushes the plastic composition or resin-forming material into the web or mat, and the heat from the mold surface causes curing or polymerization.

Hardenable mixtures of unsaturated linear polyesters and vinyl monomers as described in Ellis, U.S. Patent No. 2,255,313, and Weith, U.S. Patent No. 2,475,731, have been used in the manufacture of fabric-reinforced pipe. The hardenable mixtures develop considerable exothermic heat when cured, and one of the difficulties is to dissipate this heat rapidly enough to avoid an accelerated cure, since a rapid cure tends to induce stresses and strains, which in turn cause excessive cracking and development of fissures.

This cracking is particularly experienced when the so-called rigid type of unsaturated polyester resins are used. These are the polyester resins prepared from a glycol such as ethylene or propylene glycol, and an unsaturated dicarboxylic acid such as maleic acid, which in admixture with a vinyl monomer such as styrene, and in the presence of a catalyst, cure to form rigid, solid, infusible resinous products. Pipes prepared from such polyester resin-vinyl monomer compositions have limited application because of their low heat distortion values, and consequently are ordinarily not recommended for use where a service temperature greater than about 60° C. is expected. Pipes of greater flexibility can be obtained by use of polyester resins made from longer chain glycols, either in whole or in part, such as butylene glycol, diethylene glycol and dipropylene glycol, and also by substituting for part of the unsaturated dicarboxylic acid a saturated long chain dicarboxylic acid, such as adipic acid and sebacic acid. While these more flexible polyesters, when cured in admixture with a vinyl monomer, are less susceptible to cracking, they are, however, deficient in mechanical strength, particularly at elevated temperatures, and still have low heat-distortion values.

Another class of resinous compositions that has been found useful in manufacturing plastic pipes is the epoxy resins. These are usually the di- or poly-glycidyl ethers of polyhydric phenols, which in admixture with an organic or inorganic acid, or an alkaline catalyst, polymerize to solid, infusible plastic products. Pipes prepared with this type of resin binder do not crack to the same extent as pipes made with the unsaturated polyester-vinyl monomer mixtures previously described. However, such epoxy resin bonded pipes are subject to distortion at elevated temperatures, and are consequently of restricted usefulness.

An object of this invention is the manufacture of new plastic piping, having higher heat resistance than that heretofore obtained from polymerizable mixtures of unsaturated polyesters and vinyl monomers, or from epoxy resins.

Another object is a method of manufacturing plastic pipe by the centrifugal casting method to produce plastic pipe substantially free of cracks and fissures.

A further object is to control and absorb the exothermic heat of reaction liberated during the curing of unsaturated polyester resin-vinyl monomer mixtures by means of an epoxy resin, which exothermic heat is in turn utilized to promote the cure of the epoxy resin.

An additional object is the manufacture of a heat-resistant, structurally-strong, fiber-reinforced plastic pipe having an inner surface consisting of a solid, infusible epoxy resin and an outer surface of essentially copolymerized unsaturated polyester and vinyl monomer resin integrally bonded to said inner surface.

These and other objects of the invention will become evident as the description of the invention proceeds.

The drawing is a cross section view of the fibrous reinforced plastic pipe of this invention, showing the relationship existing between the two resinous layers and the fibrous filler.

It has now been found by first partially impregnating a fibrous reinforcement with a layer of a catalyst containing liquid polymerizable mixture of an unsaturated polyester resin and a vinyl monomer, initiating polymerization of said mixture, and then just prior to or as said mixture begins to react exothermically, further impregnating said fibrous filler with a liquid heat-hardenable epoxy resin which may be introduced at room temperature or preheated to about 80° C., that thereby sufficient exothermic heat is absorbed by the epoxy resin to cause the polymerizable mixture of unsaturated polyester-vinyl monomer to cure to a solid, substantially crack-free state. The heat absorbed by the epoxy resin mixture initiates the curing of said epoxy resin, and if necessary, only slight additional applied heat is required to complete the curing of the epoxy resin to a solid infusible condition. Surprisingly, while the epoxy resin and the polymerizable polyester resin-vinyl monomer mixture do not appreciably intermingle during curing, and in fact form separate concentric layers, which are integrally bonded at their interfaces, such composite binder containing two layer pipe may have a heat distortion value as much as 80° C. to 110° C. higher than pipe made solely from an epoxy resin, or solely from a polymerizable mixture of unsaturated polyester resin and vinyl monomer.

A preferred manner of applying the two types of impregnants is to place a cylindrically wrapped tube of fabric or fibrous mat or web, as for example glass cloth or web, in a mold heated to about 85° C., and just prior to rotating, or while the mold is rotating at about 2800 r.p.m., a peroxide catalyzed fluid mixture of polyester resin and vinyl monomer is applied to the glass cloth or web as by pouring it into said mold. An amount insufficient to completely saturate the fibrous mat is added, and the centrifugal force serves to distribute the liquid mixture uniformly in the fibrous material and along the inner periphery of the mold. Preferably the amount of liquid polyester resin-vinyl monomer added and the rotating speed is such that while the outer surface of the fibrous tube is completely imbedded within the polymerizable polyester resin-vinyl monomer mixture, the inner surface of the cylindrically wrapped fabric tube is substantially devoid of the fluid mixture, preferably to a depth of about one-eighth to one-half the finished thickness of the two layer pipe. Devoid is used in the sense that while the fibers may be wetted with the polymerizable mixture of polyester resin-vinyl monomer, the interstices between the fibers and the spaces between the layers of fibrous material are still open for impregnation by the epoxy resin.

The vinyl monomer and polyester components of the copolymerizable mixture begin to react with each other as soon as they come into contact with the heated mold surface. The viscosity of the mixture rapidly increases, and usually within two to ten minutes the copolymerizable mixture has turned into a soft gel, and with continued heating the gel hardens to a rigid hard state. Preferably the addition of the epoxy resin is delayed until the polyester resin-vinyl monomer mixture has reacted to the soft gel stage, or has sufficiently increased in viscosity to prevent its displacement from the outer area of the pipe by the epoxy resin. It is also preferred not to delay the addition of the epoxy resin for too long a period after initial gelation of the unsaturated polyester resin-vinyl monomer mixture, since better bonding of the epoxy resin mixture to the polyester resin-vinyl monomer copolymer is obtained when the epoxy resin mixture is added while the polyester resin-vinyl monomer copolymer is still in a soft gel stage, rather than when the copolymer has reacted to a relatively hard state. Optimum cured properties are generally obtained when the epoxy resin is added before the polyester resin-vinyl monomer mixture reaches its peak exothermic temperature, which usually occurs immediately after the "gel time," and results in the rapid curing of the gelled material to a hard infusible mass.

The "gel time" varies with the particular polyester resin-vinyl monomer mixture employed, with the catalyst, and with the temperature at which the reaction is initiated. A standard method used by the members of the Society of the Plastics Industry for determining this point is to plot the so-called "exothermic curve" for the polyester resin-vinyl monomer composition; this is ordinarily done in the following manner.

To 100 parts by weight of the polyester resin-vinyl monomer composition to be tested is added two parts of a 1:1 paste of benzoyl peroxide and tricresyl phosphate. After standing for one hour at 25° C., ten grams of the mixture is placed in a test tube six inches long and three-quarters of an inch in diameter, and the tip of a one-eighth inch thermocouple connected to a fast indicating recorder is placed in the middle of the mixture. The test tube is immediately immersed in a constant temperature water bath kept at a temperature of 82.2° C.±0.1° C., and from the temperature curve drawn by the recording instrument three characteristic data may be obtained. These are (1) the gel time, defined as the time interval for the mixture's temperature to increase from 65.6° C. to 87.8° C.; (2) the exothermic peak temperature, which is the maximum temperature reached during the curing cycle; and (3) the cure time, the time interval between 65.6° C. and the peak temperature.

By this test method it is possible to determine with reasonable accuracy the time required in practical molding operations for any given polyester resin-vinyl monomer composition to reach its peak curing temperature and, therefore, the approximate length of cure time during which the polyester resin composition is still in a soft gel stage, and the epoxy resin can be added to successfully moderate the curing of the unsaturated polyester-vinyl monomer composition, and obtain a substantially crack-free molding. It should be noted, however, that the "exothermic curve" will also vary with the initiating temperature and catalyst employed. Consequently, if these are other than standard, the test should run at the temperature substantially duplicating the conditions under which the polyester resin-vinyl monomer mixture is to be employed in making pipe.

The polyesters which are preferentially employed in this invention in admixture with the vinyl monomers are the linear polyesters prepared by the esterification of substantially stoichiometric quantities of an ethylenically unsaturated dicarboxylic acid, such as maleic acid, fumaric acid, or the anhydrides of said acids, with a glycol containing from 2 to 3 carbon atoms, such as ethylene glycol and propylene glycol. The esterification is preferably carried out under a protective atmosphere of carbon dioxide or nitrogen to minimize oxidation, and with agitation to prevent local over-heating and subsequent darkening of the product. When the esterification is essentially complete, that is when the polyester has an acid number between 15 and 60, the reaction mixture is vacuum stripped at a pressure of about 50 mm. mercury and a temperature of about 200° C. for about one hour to remove unreacted starting materials and low boiling reaction products formed during the esterification.

Additional suitable ethylenically unsaturated dicarboxylic acids for use in this invention besides maleic acid and fumaric acid, are chloromaleic acid, or its anhydride, and the cyclopentadiene adducts of maleic acid or maleic anhydride, e.g., cis-3,6-endomethylene - delta-4-tetra-hydrophthalic acid. The use of such adducts in preparing polyester resins is described in Weith, U.S. Patent No. 2,475,731.

Part of the ethylenically unsaturated dicarboxylic acid may be replaced by saturated dicarboxylic acids, such as phthalic acid and tetrahydrophthalic acid or their anhydrides. In general, not more than an equimolar quantity of such acids are used per mole of the ethylenically unsaturated acids.

It is also possible to prepare suitable polyesters by using mixtures of ethylenically unsaturated dibasic acids and mixtures of glycols, resulting in the formation of mixed polyesters.

The preferred vinyl monomers are styrene and vinyl toluene. The ratio, by weight, of polyester resin to vinyl monomer can be varied from one to four parts of polyester resin for each part of vinyl monomer.

Since these mixtures of unsaturated polyester and vinyl monomer are usually not very stable on storage, it is customary to add about 0.001 to 0.1 percent by weight of an inhibitor such as p-tert-butyl catechol or hydroquinone. In order to rapidly cure these mixtures to a solid resinous mass, a catalyst is required; this is usually added to the syrupy resin composition a short time before it is to be cured. Suitable catalysts are benzoyl peroxide, methylethyl ketone peroxide and cyclohexanone peroxide. The amount usually incorporated is about 0.1 to 2 percent of catalyst based on the weight of polyester. If desired, a small amount of so-called promoters or activators may be added to bring about more rapid gelation; satisfactory promoters are cobalt octanoate, cobalt hexanoate and cobalt naphthenate.

The polyesters with which this invention is chiefly concerned are the rigid type of polyesters as previously described, which have a percent elongation of less than five, as determined by A.S.T.M. D636, and an impact of 0.2 to 0.4, as determined by A.S.T.M. D256. Additional properties of Rigid Polyester Resins are given in the Plastics Properties Chart, Modern Plastics Encyclopedia, 154.

The preferred epoxy resin compositions suitable for use in this invention are the liquid or low melting thermosetting epoxy resin compositions described in United States Letters Patent No. 2,506,486 issued to H. Bender et al. These epoxy resin compositions comprise a mixture of a diglycidyl ether of a bis-phenol in admixture with a bis-phenol, and are cured on heating to form solid, infusible and insoluble products of high strength. As described in Patent No. 2,506,486, various catalysts can be added to accelerate the cure.

The quantity of resinous materials used in the formation of pipes should be such that the final pipe has a total resin content between 30 and 80 percent by weight. The proportion of polyester resin-vinyl monomer mixture to epoxy resin compositions in said total resin content can be varied from about equal parts by weight of each resin composition up to eighty-five percent by weight of polyester resin-vinyl monomer mixture to fifteen percent by weight of epoxy resin composition. Generally, however, the polyester resin-vinyl monomer mixture will constitute the major portion of the resin.

The polyester resin-vinyl monomer mixture may be cured at a temperature of from about 50° C. to about 100° C. However, the preferred temperature is from about 80° C. to about 90° C. Lower temperatures than about 80° C. may be used, but then a longer curing time is required; temperatures higher than about 90° C. are not recommended because curing is usually too rapid to allow for the addition of the epoxy resin at the proper time. Preferably polyester resin-vinyl monomer mixtures are employed having a "gel time" of from about seven to about fifteen minutes at operating temperatures of 50° C. to 100° C. Mixtures having "gel times" less than seven minutes offer greater practical difficulties because they do not permit sufficient latitude in time for the introduction of the epoxy resin composition. Polyester resin-vinyl monomer mixtures having "gel times" longer than 15 minutes unduly curtail production.

It is desirable to heat the epoxy resin composition to the curing temperature of the polyester resin-vinyl monomer mixture in the mold before charging the epoxy resin mixture to the mold. In this way there is no cooling of the polyester resin-vinyl monomer composition, and more effective use is made of the exothermic heat of polymerization of the polyester resin-vinyl monomer composition. It should be pointed out, however, that pre-heating of the epoxy resin composition is not necessary to obtain satisfactory pipe; the main purpose for so doing is to reduce the total curing time in the mold. The epoxy resin compositions cure to solid, infusible products at a temperature of from about 70° C. to about 175° C. in from about 15 to about 30 minutes in the presence of from about 0.50 to about 1.50 percent catalyst.

The final composition of the finished pipe may vary from 30 parts by weight of total resin content, in which the amount of polyester resin-vinyl monomer mixture present may vary from 15 to 25 parts by weight, and the amount of epoxy resin present may vary from 5 to 15 parts by weight, and 70 parts by weight of fibrous filler, to 80 parts by weight of total resin content, in which the amount of polyester resin-vinyl monomer mixture present may vary from 40 to 66.7 parts by weight, and the amount of epoxy resin present may vary from 13.3 to 40 parts by weight, and 20 parts by weight of fibrous filler. As suitable fibrous fillers one may use glass cloth, or webs or mats; cotton duck cloth; and cloth, webs, or mats prepared from asbestos fibers, nylon, Dynel and other synthetic or natural fibers are also suitable.

If desired, pipe may be prepared by using a mixture of two or more polyester resin-vinyl monomer compositions or mixtures of two or more epoxy resin compositions.

The invention is further illustrated by the following description in which it is to be understood all parts are by weight unless otherwise specified.

PREPARATION OF POLYESTER RESIN COMPOSITION

A still fitted with agitator and reflux condenser was charged with 11.06 parts of propylene glycol in an atmosphere of carbon dioxide. To the propylene glycol was added 28.49 parts of maleic acid anhydride, and the whole was heated under reflux to 60° C. with agitation. The reaction became exothermic, and the temperature rose rapidly to about 170° C. Then 1.15 parts of xylene was added, and the pressure reduced on the still such that the reaction mixture was cooled to a temperature of 150° C. There was then added 0.33 part of oxalic acid, which was followed by 14.42 parts of dicyclopentadiene added over a period of 30 to 40 minutes, the temperature being maintained at 150° C. After all of the dicyclopentadiene had been added, another 12.2 parts of propylene glycol and 0.03 part of hydroquinone were added, and the reaction mixture was refluxed at 150° C. and atmospheric pressure for 1.5 hours, the temperature being gradually raised to 200° C. during this period. The reflux distillate was recycled through a trap so that water formed during the reaction would be removed. Refluxing of the reaction mixture was continued until a test sample showed an acid number of 35–36. It was necessary during this period to add 0.32 part of xylene in order to maintain an adequate reflux rate. The mixture was then dehydrated at about 200° C. and a pressure of 40 to 50 mm. mercury for about one hour. The reaction was cooled to about 180° C., and 0.01 part of hydroquinone was added. After further cooling to 105° C., 32.0 parts of styrene was added and stirred to homogeneity. The resulting polyester resin-vinyl monomer mixture was a syrup having a viscosity of 400 to 800 cst. at 25° C. Yield was about 89 parts. A sample of this polyester resin-styrene composition on testing cured to a rigid polyester having an elongation of about 2 to 3 percent.

PREPARATION OF EPOXY RESIN COMPOSITION

A diglycidyl ether was prepared as described in Example I of U.S. Letters Patent No. 2,506,486, having an epoxy content of 92.6 percent of the theoretical calculated as the diglycidyl ether of 4,4'-dihydroxydiphenylpropane.

The epoxy resin composition used in fabricating the pipe was prepared by blending 68.4 parts of the above described diglycidyl ether with 31.6 parts of 4,4'-dihydroxydiphenylpropane, the resultant liquid composition having a viscosity of about 500 to 1000 cps. at 75° C.

FABRICATION OF THE PIPE

A strip of Owens-Corning T–16 glass fiber mat approximately 50 inches long and 5¾ inches wide, and weighing about 85 to 90 grams was rolled into a cylinder 5¾ inches high and about 4 inches in diameter. This was inserted into a laboratory centrifugal casting machine, equipped with a 4½ inches diameter mold 6 inches long, and sufficiently unwound to produce a tight fit against the inside wall of the mold. This formed a tube of about 3½ turns and about ¼ inch thick. After proper assembly of the mold in the machine, heat was applied to the mold by means of electrically heated covers, and the mold was spun at about 2800 r.p.m. When the temperature of the mold surface reached 85° C., about 230 grams of the polyester resin-vinyl monomer hereinbefore described, which contained 0.2 percent by weight of cobalt naphthenate as promoter and one percent by weight of a 60 percent solution of methylethyl ketone peroxide in dimethylphthalate as catalyst, was poured into the spinning mold. Centrifugal force pushed the polyester resin-vinyl monomer composition evenly into the fiber glass cylinder, the amount of composition being just sufficient so that while the inner surface of the fiber glass cylinder was substantially devoid of resin to a depth of about one-sixteenth of an inch from the inside surface, a continuous liquid layer of polyester resin-vinyl monomer mixture was present against the inside wall surface of the cylindrical mold, and also in the glass fibers of the outer periphery section of the fiber glass cylinder. After spinning at 85° C. and at about 2800 r.p.m. for about eight minutes to cure the polyester resin to the gelation point, there was added 55 to 60 grams of the epoxy resin composition described above, which contained 0.6 percent by weight of alpha methylbenzyldimethylamine as catalyst; this epoxy resin composition had been heated to 80° C. before charging to the mold. The amount of epoxy resin composition used was sufficient to completely cover the inner exposed portion of the glass mat and give a smooth inner coating, and the centrifugal force served to distribute it evenly in the fiber glass cylinder. The speed of the mold was then decreased to about 2200 r.p.m., and the temperature was maintained at about 85° C. for about eight minutes. Then spun at 2200 r.p.m. for ten minutes at 105° C., ten minutes at 130° C. and finally thirty minutes at 150° C. At the end of this cycle the plastic pipe was allowed to cool to room temperature, and removed from the mold. The resulting pipe had a wall about 5/16 inch thick, weighed 380 grams, and had the following weight composition: 22.8 percent glass mat; 60.3 percent polyester resin composition; and 16.9 percent epoxy resin composition.

The glass fiber reinforced polyester-epoxy pipe when tested had the physical properties shown in Table I. For comparison, the physical properties of pipes prepared with the same resin compositions, but which consisted entirely of polyester resin-vinyl monomer mixture and entirely of epoxy resin composition, are also listed in Table I.

Table I

|  | Polyester/Epoxy Pipe | Polyester Pipe | Epoxy Pipe |
|---|---|---|---|
| Heat Distortion, ° C | 190 | 80 | 91.5 |
| Izod Notched ft. lbs. in Width | 5.45 | 5.00 |  |
| Izod Unnotched ft. lbs. in Width | 9.14 | 9.0 | 20.0 |
| Compression Strength Axial, p.s.i | 16,750 | 16,000 | 18,600 |
| Compression Strength Diam., p.s.i | 175 | 150 | 123 |
| Flexural Strength at: |  |  |  |
| 23° C., p.s.i | 13,500 | 16,520 | 23,083 |
| 60° C., p.s.i | 13,370 | 6,770 | 13,930 |
| 100° C., p.s.i | 10,050 | 2,372 | 1,550 |
| Flexural Modulus at: |  |  |  |
| 23° C., p.s.i | 0.885×10⁶ |  | 0.8×10⁶ |
| 60° C., p.s.i | 0.55×10⁶ |  | 0.4×10⁶ |
| 100° C., p.s.i | 0.35×10⁶ |  | 0.2×10⁶ |
| Tensile Strength at: |  |  |  |
| 23° C., p.s.i | 7,840 | 7,310 | 14,300 |
| 60° C., p.s.i | 6,280 | 4,280 | 11,300 |
| 120° C., p.s.i | 4,970 | 960 | 1,030 |

Using the procedure and resin compositions which have been described in this invention, it is possible to produce strong, crack-free pipe by the centrifugal casting method at a relatively high rate of production. The pipe produced by this method shows a uniformity of physical properties when the same resin compositions are used, and is especially desirable because of its high structural and tensile strengths at elevated temperature. In addition, it shows a much greater resistance to distortion on heating. While an all-polyester resin-vinyl monomer copolymer pipe shows distortion at 80° C., and an all-epoxy resin pipe shows distortion at 91.5° C., a pipe prepared by the herein-described procedure shows no distortion until the temperature has been raised to about 190° C.

This new pipe is also characterized by a high weight strength ratio and a high degree of corrosion resistance, and can be used wherever such type of product is desired.

What is claimed is:
1. Composite fibrous reinforced plastic pipe comprising an outer stratum of fiber bonded by a copolymerized unsaturated polyester-aryl vinyl monomer mixture, wherein the polyester comprises a liquid copolymer of an ethylenically unsaturated dicarboxylic acid with a glycol, and an inner concentric stratum of fibrous filler bonded by a polymerized epoxide resin composition, said epoxide resin composition comprising a heat-hardenable glycidyl ether of a polyhydric phenol, said glycidyl ether containing at least two glycidyl groups, said fiber reinforced strata being integrally bonded together, and comprising per 100 parts by weight of pipe from about 30 to about 80 parts by weight total resin solids, of which the epoxy resin solids constitutes from about 16.7 to about 50 percent by weight of the total resin solids.

2. A plastic pipe as described in claim 1, wherein the epoxide resin composition is a mixture of a polyglycidyl ether of a polyphenylol and a bis-phenol.

3. A plastic pipe comprising per 100 parts by weight of pipe from 30 to 80 parts by weight total resin solids, of which from about 16.7 to about 50 percent by weight of the total resin solids present consists of a heat-hardened epoxy resin composition, said epoxy resin composition comprising a heat-hardenable glycidyl ether of a polyhydric phenol, said glycidyl ether containing at least two glycidyl groups, and from about 50 to 83.3 percent by weight of the total resin solids present consists of a copolymerized mixture of a liquid polyester resin from the group consisting of ethylene glycol maleate and propylene glycol maleate and an aryl vinyl monomer selected from the group consisting of styrene and vinyl toluene, and from 20 to 70 parts by weight of fibrous filler; said pipe having an outer stratum of fiber reinforced with said copolymerized polyester resin-aryl vinyl monomer mixture and an inner concentric stratum of fiber reinforced with said epoxy resin, said fiber reinforced strata being integrally bonded together.

4. A plastic pipe comprising from about 20 to 70 parts by weight of fibrous filler, and from about 30 to 80 parts by weight of cured resinous binder, said binder consisting of from about 15 to about 66.7 parts by weight of a copolymerized polyester resin-aryl vinyl monomer composition, said polyester resin comprising a copolymer of an ethylenically unsaturated dicarboxylic acid with a glycol, and from about 5 to 40 parts by weight of a polymerized epoxide resin composition, said epoxide resin composition comprising a heat-hardenable glycidyl ether of a polyhydric phenol, said glycidyl ether containing at least two glycidyl groups, wherein the outside surface of the plastic pipe is essentially composed of fibrous filler integrally bonded by copolymerized polyester aryl vinyl monomer mixture and the inside surface of the plastic pipe, to a depth of at least about 1/8 inch is essentially composed of fibrous filler bonded by the epoxide resin, the two layers being integrally bonded to each other, and the fibrous filler being distributed in the two resin compositions.

5. A plastic fibrous reinforced pipe containing from about 20 to 70 parts by weight of fibrous filler, and from about 30 to 80 parts resinous binder, said pipe comprising an outer stratum of fibrous filler bonded with a copolymerized mixture of an unsaturated polyester and a vinyl monomer, said polyester being selected from the group consisting of ethylene glycol chloromaleate, ethylene glycol maleate, ethylene glycol fumarate, and propylene glycol maleate and said vinyl monomer being selected from the group consisting of styrene and vinyl toluene, said copolymerized mixture constituting from about 50 to about 85 percent by weight of the total resinous binder, and an inner stratum of fibrous filler bonded with a heat hardened epoxide resin composition comprising the diglycidyl ether of a dihydroxydiphenyl alkane in admixture with a dihydroxydiphenyl alkane, said epoxide resin composition constituting from 16.7 to about 50 percent by weight of the total resinous binder, the two fibrous strata being integrally bonded together.

References Cited in the file of this patent

UNITED STATES PATENTS

| 2,467,999 | Stephens | Apr. 19, 1949 |
| 2,594,693 | Smith | Apr. 29, 1952 |
| 2,653,887 | Slayter | Sept. 29, 1953 |
| 2,785,442 | Boggs | Mar. 19, 1957 |
| 2,815,043 | Kleiner et al. | Dec. 3, 1957 |
| 2,824,033 | Donaldson | Feb. 18, 1958 |